United States Patent
Chatow et al.

(10) Patent No.: US 9,163,991 B2
(45) Date of Patent: Oct. 20, 2015

(54) COLOR SPACE COLOR VALUE DETERMINATION FROM DIGITAL IMAGE

(71) Applicant: Hewlett-Packard Development Company, L.P., Houston, TX (US)

(72) Inventors: Udi Chatow, Palo Alto, CA (US); Nathan Moroney, Palo Alto, CA (US); Wei Koh, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 241 days.

(21) Appl. No.: 13/754,116

(22) Filed: Jan. 30, 2013

(65) Prior Publication Data

US 2014/0212035 A1 Jul. 31, 2014

(51) Int. Cl.
G06K 9/00 (2006.01)
G01J 3/52 (2006.01)
G01J 3/46 (2006.01)
G01J 3/50 (2006.01)
H04N 1/60 (2006.01)

(52) U.S. Cl.
CPC ............... *G01J 3/524* (2013.01); *G01J 3/463* (2013.01); *G01J 3/50* (2013.01); *H04N 1/6047* (2013.01)

(58) Field of Classification Search
USPC ........... 382/162, 165, 167, 181, 190; 358/1.9
See application file for complete search history.

(56) References Cited

U.S. PATENT DOCUMENTS

| | | | |
|---|---|---|---|
| 8,073,248 B2 * | 12/2011 | Brunner et al. | 382/165 |
| 8,208,758 B2 * | 6/2012 | Wang et al. | 382/282 |
| 8,229,210 B2 | 7/2012 | Rao | |
| 2005/0007449 A1 | 1/2005 | Ikado | |
| 2007/0242877 A1 * | 10/2007 | Peters et al. | 382/167 |
| 2009/0325631 A1 | 12/2009 | Linjama et al. | |
| 2012/0099788 A1 * | 4/2012 | Bhatti et al. | 382/167 |
| 2013/0011062 A1 * | 1/2013 | Conwell et al. | 382/173 |

FOREIGN PATENT DOCUMENTS

WO 2011089096 A1 7/2011

OTHER PUBLICATIONS

C-H. Son et al., "RealOtime color matching...," Journal of Imaging Science & Technology, 2007.

\* cited by examiner

*Primary Examiner* — Yon Couso
(74) *Attorney, Agent, or Firm* — Michael A Dryja

(57) ABSTRACT

A device captures a digital image of a color of interest and a physical color calibration chart. A corrected color value of the color of interest is determined based on the physical color calibration chart and the color of interest as captured within the digital image. A selected color value for the corrected color value is determined, as a closest color value within a predetermined color space or as a spot color value within the predetermined color space.

11 Claims, 2 Drawing Sheets

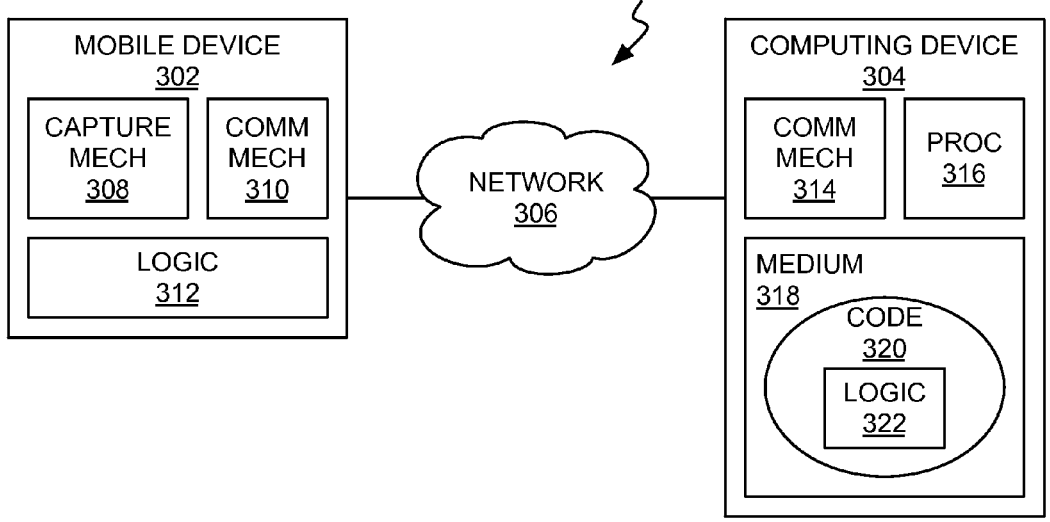
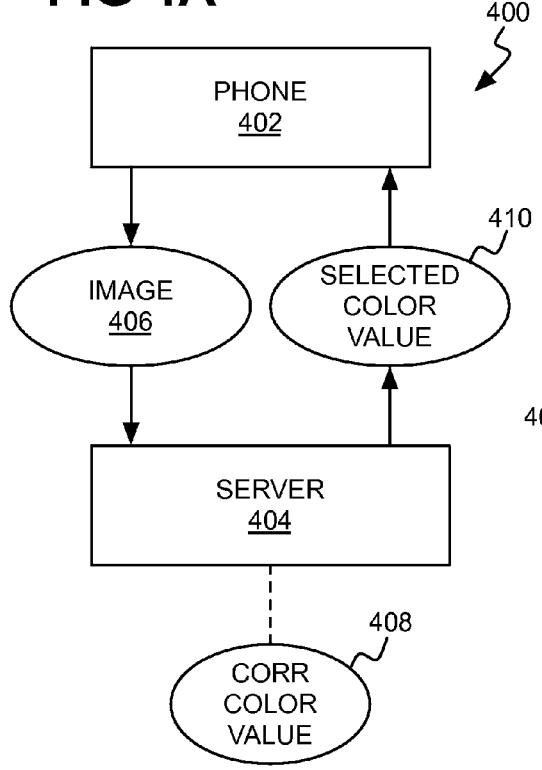
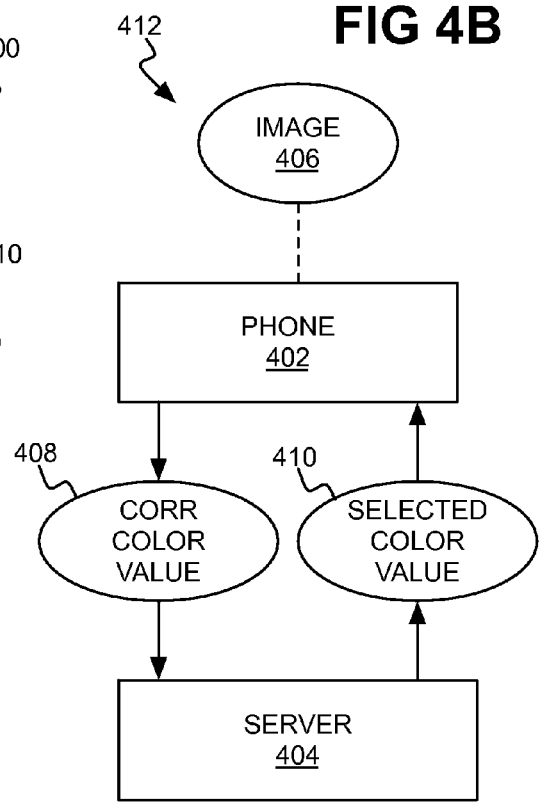

COLOR SPACE COLOR VALUE DETERMINATION FROM DIGITAL IMAGE

BACKGROUND

Color is an important consideration for many types of users, including business users, interior decorators, graphic designers, and even home users. For example, interior decorators may want to precisely select paint and other colors. As another example, graphic designers may want to precisely select colors for printing materials that are as varied as promotional materials, magazine articles and advertisements, and so on.

BRIEF DESCRIPTION OF THE DRAWINGS

FIG. 3 is a diagram of an example system in which a selected color value is determined from a mobile device-captured uncalibrated digital image of a color of interest.

FIGS. 4A and 4B are diagrams of different example scenarios by which a selected color value is determined from a mobile device-captured uncalibrated digital image of a color of interest within a system.

DETAILED DESCRIPTION

Figure 1:
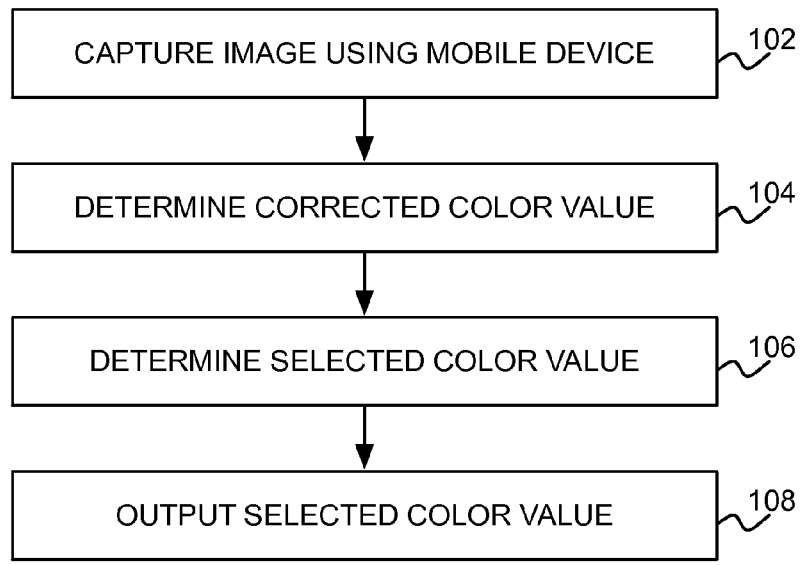
FIG. 1 is a flowchart of an example method in which a selected color value is determined from a mobile device-captured uncalibrated digital image of a color of interest.

As noted in the background section, color is an important consideration for many different types of users. Traditionally, users have precisely selected colors by reviewing printed and online color books that accurately show available colors. However, as smartphones and other types of mobile devices have become near-ubiquitous, more users are seeking inspiration for color choices during their daily lives, such as while shopping, traveling, and so on. A user may find the "perfect color" for a project he or she is working on, for example, and want to find a print-reproducible version, paint-reproducible version, etc.

Many users, especially novice users, may expect that taking a picture using a smartphone of a desired color can permit accurate determination of such a print- or paint-reproducible version of this color. However, this is generally not the case. Most smartphones and other types of mobile devices capture uncalibrated digital images that do not capture color with the required color accuracy. Even the few such devices that do may not be able to accurately capture the color the user sees, because of the lighting and other variables of the scene or environment in which a picture is being taken. As such, a user may become frustrated that while he or she saw and even took a picture of the "perfect color," a print- or paint-reproducible version thereof is unable to be identified accurately and/or easily.

Techniques disclosed herein overcome these shortcomings. A mobile device captures an uncalibrated digital image of a physical scene that includes a color of interest as well as a physical color calibration chart. A corrected color value of the color of interest is determined, based on the physical color calibration chart and the color of interest as captured within the image. A selected color value is then determined for this corrected color value. For instance, the selected color value may be the closest color value within a given color space to the corrected color value, or a spot color value within a given color space.

As such, a user just has to bring along a small chart when out and about to accurately identify colors that the user sees. The user can use his or her smartphone to capture an image of a discovered color of interest with the chart placed alongside. This color of interest is convertible to a corrected color value that accurately describes the color of interest, because the color calibration chart has been digitally captured under the same conditions as the color of interest itself. The corrected color value is then itself converted to the given color space available to the user, as the selected color value. For example, print designers may be interested in determining the closest color within the cyan-magenta-yellow-black (CMYK) color space, whereas interior designers may be interested in determining the best-matching spot paint color that can be achieved by mixing various paint pigments.

For instance, the color space may be the color space that can be provided by a printing device, such as a digital or other printing press, that a print service provider (PSP) can offer. In this respect, the corrected color value is converted to the color space of such a printing device. As such, the user can be confident that the PSP will be able to print the color of interest using a printing device that the PSP has.

FIG. 1 shows an example method 100. The method 100 can be implemented as computer-executable code stored on a non-transitory computer-readable data storage medium and executable by a processor of a device. The method 100 is performed by a mobile device that is able to capture digital images, such as a smartphone, a standalone digital camera, and so on.

The mobile device captures an uncalibrated digital image of a physical scene that includes a color of interest and a physical color calibration chart (102). The mobile device can be a device that is not a professional color-capturing device. That is, the digital images that the mobile device captures are uncalibrated, in that the image-capturing mechanism of the mobile device, such as a charged coupled device (CCD) or a contact image sensor (CIS), is not able to be color calibrated or has not been color calibrated.

The physical scene is likewise uncalibrated, in that the lighting conditions and other variables that impact color rendition and accuracy within the digital image may not be ideal, and are typically not specified to any great degree of accuracy, if at all. For example, the physical scene may be an outdoors scene in which a user of the mobile device happens to be currently located, an indoor location such as a shopping mall, and so on. The user may happen upon a physical object that has the color of interest, for instance, during the normal course of his or her day.

In both these respects—from a device standpoint and from a scene or environmental standpoint—the digital image is said to be uncalibrated. Besides the color of interest, the digital image includes the physical color calibration chart. The physical color calibration chart permits the color of interest to be accurately determined, insofar as the chart can have predetermined and preselected colors and has its picture taken as part of the same image, under the same conditions and using the same device, as the color of interest itself.

A color chart as used herein is intended to encompass any suitable physical color reference comprised of a set of colors selected to enable generation of a color profile. Such a color profile can be used, for example, for color calibration of a device or color correction of an image. A color chart may be constituted as a flat, physical object colored with an arrangement of standardized color samples (e.g., a plurality of color patches). Color charts, such as the X-Rite color checker, may be rectangular and have a selected size and color patch layout.

The mobile device determines a corrected color value of the color of interest based on the physical color calibration chart and the color of interest as captured within the uncalibrated digital image (104). The corrected color value is an accurate measurement of the color of interest that corrects for the uncalibrated nature of the digital image. That is, the corrected color value is an accurate measurement of the color of interest even though the digital image was captured using an uncalibrated device and under not precisely known lighting and other environmental conditions. For example, the corrected color value may be represented as a series of color coordinates within a color scale like the CIELAB color scale.

Determination of the corrected color value can be achieved as described in one or more of the previously referenced copending patent applications. In general, because the color calibration chart has been captured in the same image as the color of interest, using the same device and under the same environmental conditions, the corrected color value of the color of interest can be determined from both the color of interest and the color calibration chart as captured within the image. In one example implementation, the mobile device includes the logic for computing the corrected color value from the color of interest and the chart as captured within the image. As such, the mobile device in this implementation can itself compute the corrected color value.

In another example implementation, the mobile device is communicatively connected to a computing device like a server computing device, over one or more networks such as mobile networks like 3G and 4G mobile networks, the Internet, and other types of networks. In this implementation, the mobile device can transmit the uncalibrated digital image to the computing device over the network. The computing device includes the logic for computing the corrected color value from the color of interest and the chart as captured within the image, and thus computes the corrected color value from the image received from the mobile device. The computing device may return the corrected color value back to the mobile device.

The mobile device determines a selected color value for the corrected color value (106). The selected color value is a conversion of the corrected color value into a predetermined color space. As an example usage scenario, the color space may include a number of base colors or pigments of paint or ink, such as the primary colors of an ink-mixing system used within digital offset color printing. In this example, the selected color value is a spot color value that is a mixture of the basic colors or pigments that best matches the corrected color value. As such, the selected color value can include which colors or pigments should be used, and in what relative ratios, to best achieve the corrected color value. Formulation approaches to compute such spot color values from corrected color values include linear programming approaches applied to color formulation models, for instance.

As another example, for print-oriented usage scenarios, the color space may be a four-color channel color space like CMYK that a given printing technology or device is able to reproduce to at least some extent. In this example, the selected color value is the closest color value that can be achieved within the color space by the given printing technology or device. As such, the selected color value includes a value for each color channel of the predetermined color space within a predetermined range that the given printing technology or device can achieve. Approaches to convert such closest color values from corrected color values generally use color look-up tables that map the color scale or space of the corrected color values to the predetermined color space, which may be customized or unique to a given printing technology or device.

As a third example, the selected color value can include delta E values for the color channels of a color space. The delta E values indicate how much the selected color value deviates from the gamut that the color space can provide. As such, if the delta E values are all zero, then this means that the selected color value is within the gamut of the color space.

In one example implementation, the mobile device can have preloaded the color look-up tables to convert the corrected color value to the closest color value, or the formulation approach to compute the spot color value from the corrected color value. In this implementation, the mobile device itself directly determines the selected color value. In another example implementation, the mobile device transmits the corrected color value to a computing device to which it is communicatively connected, as noted above. The computing device has preloaded therein the color look-up tables and/or the formulation approach, determines the selected color value for the mobile device, and may return the selected color value back to the mobile device.

The mobile device can output the selected color value (108). For example, the mobile device may display to the user a textual, numeric, and/or graphical specification of the selected color value. The textual specification of the selected color value may be a name of the selected color value, or identification thereof within a standardized color reproduction system like the Pantone color matching system. The numeric specification may include the values for the color channels of a closest color value within a predetermined color space, or the precise mixture of basic colors of a spot color value. The graphical specification may be a color patch, which can permit the user to visually verify the accuracy of the selected color value that has been determined.

As another example, the selected color value can be electronically transmitted from the mobile device to a party that is to use the selected color value for or under the direction of the user of the mobile device. For instance, if the user is working with a particular print service provider on a project, the selected color value can be sent to this provider. If the user is working with a particular paint company on a project, the selected color value can be sent to this company. The user is thus able to see a color in the real world, and nearly instantaneously determine a selected color value for this color of interest and use the selected color value in a project.

Figure 2:
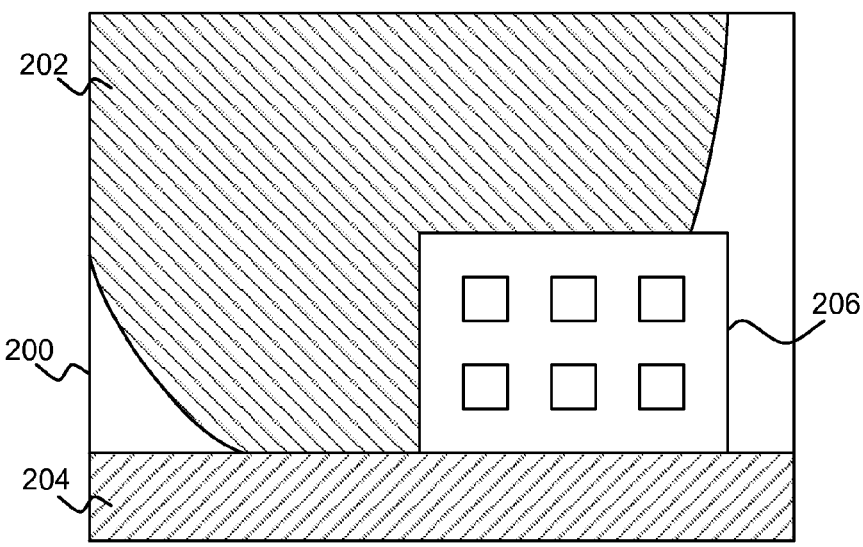
FIG. 2 is a diagram of an example uncalibrated digital image of a color of interest and a physical color chart within a physical scene.

FIG. 2 shows an example uncalibrated digital image 200 captured by a mobile device like a smartphone. A user may in the course of his or her daily life encounter a physical object like a vase 202 sitting on a table 204, and determine that the vase 202 has a color that the user thinks would be perfect for a particular project he or she is working on. That is, the color of the vase 202 is the color of interest. Therefore, the user may remove the physical color calibration chart 206 that he or she keeps in a wallet or a purse, and places it on the table 204 against the vase 202. The user may also hold up the chart 206 by or against the vase 202. The user then uses his or her mobile device to snap a picture of the resulting physical scene to capture the digital image 200.

FIG. 3 shows an example system 300. The system 300 includes a mobile device 302 and a computing device 304 that are communicatively interconnected to one another over a network 306. The mobile device 302 may be a smartphone, a tablet computing device, a digital camera device, or another type of mobile device. The computing device 304 can be a server computing device, or another type of computing device. The network 306 may be or include mobile networks, the Internet, intranets, extranets, and other types of networks as well.

The mobile device 302 includes an image-capturing mechanism 308, a communication mechanism 310, and logic 312. The mobile device 302 can include other components and mechanisms, in addition to and/or in lieu of those depicted in FIG. 3. The image-capturing mechanism 308 may be a CCD or a CIS, for instance. The communication mechanism 310 may be a wireless transceiver to permit the mobile device 302 to communicate with the computing device 304 over the network 306. The logic 312 may be realized as a combination of software and/or hardware, as described above in relation to the method 100, as well as below in relation to FIGS. 4A and 4B.

The computing device 304 includes a communication mechanism 314, a processor, and a computer-readable data storage medium 318 storing computer-executable code 320. The computing device 304 can include other components and mechanisms, in addition to and/or in lieu of those depicted in FIG. 3. The communication mechanism 314 may be a network adapter to permit the computing device 304 to communicate with the mobile device 302 over the network 306. The code 320 is executable by the processor 316 to realize logic 312.

The logic 312 of the mobile device 302 and the logic 322 of the computing device 304 interact with other components of their respective devices 302 and 304 to achieve the functionality that has been described above in relation to FIG. 1. For instance, the logic 312 causes the image-capturing mechanism 308 to capture an uncalibrated digital image of a color of interest and a physical color calibration chart. The logic 312 determines a corrected color value of the color of interest and a selected color value for the corrected color value.

The logic 312 of the mobile device 302 may itself compute the corrected color value of the color of interest. The logic 312 may instead determine the corrected color value by transmitting the uncalibrated digital image to the computing device 304 over the network 306 for the logic 322 of the computing device 304 to directly compute the corrected color value. The logic 312 of the mobile device 302 may itself generate the selected color value for the corrected color value. The logic 312 may instead determine the selected color value by transmitting the uncalibrated digital image and/or the corrected color value to the computing device 304 over the network 306 for the logic 322 of the computing device 304 to directly generate the selected color value.

In one example usage scenario, the mobile device 302 determines the selected color value without any assistance from the computing device 304. In this usage scenario, the communication mechanism 310 may not be present. The mobile device 302 thus captures the uncalibrated digital image, itself determines the corrected color value, and itself determines the selected color value. This usage scenario can be advantageous where the mobile device 302 has limited or no connectivity with the network 306, and therefore is at least temporarily unable to communicate the uncalibrated digital image or the corrected color value to the computing device 304.

FIGS. 4A and 4B show two other example usage scenarios 400 and 412, respectively. FIGS. 4A and 4B are described in relation to a smartphone 402 and a server 404 as particular types of the mobile device 302 and the computing device 304, respectively. The network 306 is not explicitly depicted in FIGS. 4A and 4B for illustrative convenience, but the mobile device 302 and the computing device 304 are communicatively interconnected over such a network 306, even if the network 306 is simply a peer-to-peer or ad-hoc network.

In the example usage scenario 400 of FIG. 4A, the smartphone 402 captures an uncalibrated digital image 406 of a color of interest and a physical color calibration chart and transmits the image 406 to the server 404. The server 404 in turn generates the corrected color value 408 of the color of interest on behalf of the smartphone 402 from the color of interest and the chart as captured within the digital image 406. The server 404 also generates the selected color value 410 for the corrected color value 408 on behalf of the smartphone 402 and transmits the selected color value 410 back to the smartphone 402.

In the example usage scenario 412 of FIG. 4B, the smartphone 402 captures the uncalibrated digital image 406, and itself generates the corrected color value 408 of the color of interest from the color of interest and the physical color calibration chart as captured within the image 406. The smartphone 402 transmits the corrected color value 408 to the server 404. The server 404 generates the selected color value 410 for the corrected color value 408 on behalf of the smartphone 402 and transmits the selected color value 410 back to the smartphone 402.

Therefore, in both the example usage scenarios 400 and 412, the smartphone 402 is said to determine the selected color value 410 via the server 404 generating the selected color value 410 on behalf of the smartphone 402. In the example usage scenario 400, the smartphone 402 is also said to determine the corrected color value 408 via the server 404 generating the corrected color value 408 on behalf of the smartphone 408. The differences between the usage scenarios 400 and 412 are two-fold.

First, in the example usage scenario 400, the smartphone 402 sends just the uncalibrated digital image 406, whereas in the example usage scenario 412, the smartphone 402 does not send the image 406 and rather sends just the corrected color value 408. Second, in the example scenario 400, the server 404 directly generates the corrected color value 408, whereas in the example scenario 412, the smartphone 402 directly generates the corrected color value 408. However, in both the scenarios 400 and 412, the server 404 directly generates the selected color value 410.

The example usage scenarios 400 and 412 can be advantageous insofar as it may be easier to update approaches, methodologies, color look-up tables, algorithms, and so on, by which the corrected color value 408 and/or the selected color value 410 are generated at the server 404 than at the smartphone 402. For example, the logic 312 of the mobile device 302 may be in the form of a computer program, or "app." A user downloads the computer program into the mobile device 302, where the program is stored on a computer-readable data storage medium of the device 302 from which a processor of the device 302 can execute the program. In this respect, it can be said that the logic 312 is implemented or realized by this computer program, computer-readable data storage medium, and/or processor.

When at least the manner by which the selected color value 410 is generated (and/or the manner by which the corrected color value 408 is generated in the usage scenario 400) has been updated, this computer program does not itself have to be updated in the usage scenarios 400 and 412. Rather, just the server 404 has to be updated by a server provider. This is because the computer program running on the smartphone 402 transmits the digital image 406 or the corrected color value 408 to the server 404, and the server 404 itself directly generates the selected color value 410. As such, a user of the smartphone 402 can benefit from updates to the manner by which the selected color value 410 is generated, for instance, without having to update the program itself.

The techniques disclosed herein can be employed in the context of a system that is operated by a provider and which communicates with a device, like a mobile device, operated by an end user different from the provider. The system may thus receive a digital image from the device, where this digital image includes a color of interest and a physical color calibration chart. The system in turn determines the corrected color value and the selected color value as described. The system can then transmit the selected color value back to the device of the user, or to a different device.

For instance, this different device may be operated by a different provider than the provider operating the system. The different device may be operated by a print service provider, for example. In this implementation, then, the provider operating the system provides a service that is used by users of mobile and other devices, and by print service or other types of providers. The system permits such print service or other providers to obtain the selected color values for colors of interest captured within images taken by the users with their mobile or other devices.

We claim:

1. A system comprising:
    a communication mechanism to communicatively connect with a device to receive therefrom a digital image of a color of interest and a physical color calibration chart; and
    a logic mechanism to determine a corrected color value of the color of interest from the physical color calibration chart and the color of interest as captured within the digital image, and to determine a selected color value for the corrected color value, as a spot color value within a predetermined color space comprising a plurality of basic colors, the spot color value comprising a mixture of the basic colors that matches the corrected color value,
    wherein the communication mechanism is further to transmit the selected color value to one or more of the device and a different device,
    and wherein the selected color value is a specification of relative ratios of the basic colors to be mixed to match the corrected color value.

2. The system of claim 1, wherein the device is a mobile device operated by a user, and the communication mechanism is to communicate with the mobile device over a network, the system operated by a provider different than the user.

3. The system of claim 1, wherein the communication mechanism is to transmit the selected color value at least to the different device, the different device operated by a first provider different than a user operating the device and different than a second provider operating the system.

4. The system of claim 3, wherein the first provider is a print service provider.

5. The system of claim 1, wherein the logic mechanism is to compute the spot color value from the corrected color value using a formulation approach.

6. A non-transitory computer-readable data storage medium storing logic executable by a mobile device having image-forming capability to perform a method comprising:
    capturing a digital image of a color of interest and a physical color calibration chart; and
    determining or receiving a selected color value for a corrected color value of the color of interest within a predetermined color space comprising a plurality of basic colors, the spot color value comprising a mixture of the basic colors that matches the corrected color value,
    wherein the corrected color value of the color of interest is determined from the physical color calibration chart and the color of interest as captured within the digital image,
    and wherein the selected color value is a specification of relative ratios of the basic colors to be mixed to match the corrected color value.

7. The non-transitory computer-readable data storage medium of claim 6, wherein the method includes determining both the corrected color value and the selected color value.

8. The non-transitory computer-readable data storage medium of claim 6, wherein the method includes receiving the selected color value,
    and wherein the method further comprises:
        transmitting the digital image to a computing device to which the mobile device is communicatively connected; and
        receiving the selected color value from the computing device.

9. The non-transitory computer-readable data storage medium of claim 6, wherein the further method includes determining just the corrected color value,
    and wherein the method further comprises:
        transmitting the corrected color value to a computing device to which the mobile device is communicatively connected; and
        receiving the selected color value from the computing device.

10. A method comprising:
    determining, by a computing system, a corrected color value of a color of interest captured within a digital image;
    determining, by the computing system, a selected color value for the corrected color value, as a spot color value within a predetermined color space comprising a plurality of basic colors, the spot color value comprising a mixture of the basic colors that matches the corrected color value; and
    outputting, by the computing system, the selected color value,
    wherein the selected color value is a specification of relative ratios of the basic colors to be mixed to match the corrected color value.

11. The system of claim 1, wherein the basic colors are pigments of ink, and the selected color value is a specification of relative ratios of the pigments of ink to be mixed to best match the corrected color value.

* * * * *